Fig. 3.

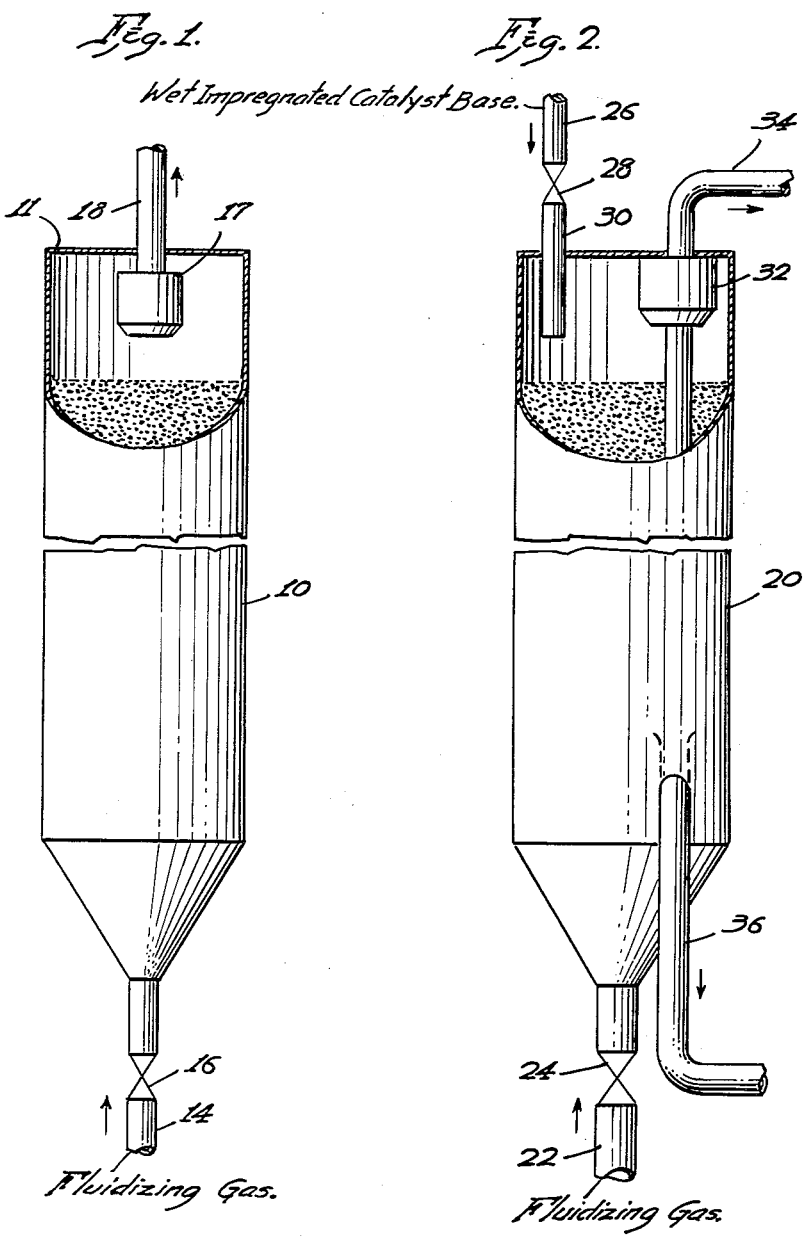

United States Patent Office 2,741,602
Patented Apr. 10, 1956

2,741,602

PROCESS FOR PREPARING IMPREGNATED CATALYSTS

Joseph B. McKinley, Pittsburgh, and Charles W. Montgomery, Oakmont, Pa., assignors to Gulf Research & Development Company, Pittsburgh, Pa., a corporation of Delaware Application April 4, 1952, Serial No. 280,475

9 Claims. (Cl. 252—410)

This invention relates to a process for preparing impregnated catalysts.

Among the most widely used catalysts in the chemical and petroleum industries are those prepared by impregnation techniques. These catalysts are prepared by impregnating a base or carrier with an impregnating solution and subsequently drying the mixture. Difficulties have arisen relative to the preparation of these types of catalysts as they often display impregnation irregularities. Inasmuch as the catalytic properties of the catalyst are a function of the degree of uniformity of impregnation, irregularly impregnated catalysts do not possess their full potential catalytic activity. This is true both where the base may have little or no catalytic activity in and of itself, as well as in cases where the base contributes to the final catalytic activity.

One of the main causes of irregular impregnation arises from the migration of impregnating solution between the catalyst base particles when the wet impregnated catalyst base is being dried. Thus, for example, in conventional procedures such as where the impregnated catalyst base is tray dried following impregnation, solution migration inevitably results during the tray drying with a resultant uneven dispersion of impregnant on the catalyst base particles.

Moreover, another difficulty encountered in prior art methods for preparing impregnated catalysts has been the long drying times required for the preparation of large batches of catalyst. Conventional catalyst bases comprise highly porous materials so that to secure adequate tray drying protracted time periods are required.

This invention relates to a process for preparing impregnated catalysts. Thus, finely divided catalyst base particles are impregnated with an impregnating solution containing a component of the catalyst and the excess impregnating solution is removed from the wet impregnated catalyst base particles. The wet impregnated catalyst base particles are mixed with previously dried impregnated catalyst particles at a temperature of not more than about 25° C. above the boiling point of the impregnating solution and preferably below the boiling point of the impregnating solution. The mixture is then at least partially dried by maintaining it fluidized, preferably at a temperature below about 150° C. In general, the temperature of drying is not critical after the wet particles have been separated by dry ones. It is often preferred, however, to at least partially dry at a temperature below the boiling point of the impregnating solution and then to increase the temperature above the boiling point of the impregnating solution to complete drying.

The process of our invention can be effected in a number of ways. Thus, wet impregnated catalyst base particles can be mixed with dried catalyst particles at a temperature of not more than about 25° C. above the boiling point of the impregnating solution and preferably below the boiling point of the impregnating solution, and the drying of the mixture instituted by fluidizing the mixture and maintaining it in the form of a fluid. The foregoing method is a batch procedure and is of special utility for the preparation of relatively small amounts of catalyst. Where it is desired to prepare the impregnated catalyst by a continuous method, this can be accomplished by continuously adding wet impregnated catalyst base particles to a fluid bed of dry catalyst maintained at a temperature of not more than about 25° C. above the boiling point of the impregnating solution, and preferably below the boiling point of the impregnating solution, drying the mixture, and continuously withdrawing dried catalyst from the fluid bed. An alternative modification which is to be preferred in many cases comprises adding wet impregnated catalyst base particles to a first fluid bed of dry catalyst maintained at a temperature of not more than about 25° C. above the boiling point of the impregnating solution, and preferably below the boiling point of the impregnating solution, and partially drying the catalyst base particles in the first fluid bed. A mixture containing partially dried catalyst base particles is withdrawn from the first fluid bed and passed to a second fluid bed maintained at a temperature which can be in excess of the boiling point of the impregnating solution, and the drying of the impregnated base particles is completed therein. A portion of the dried catalyst from the second fluid bed is removed and recycled to the first fluid bed which enables the process to be continuous.

The process of our invention is useful for the preparation of diverse impregnated catalysts in the chemical and petroleum arts. It is especially useful for preparing impregnated catalysts for use in hydrogenation processes such as hydrocracking and hydrodesulfurization, but it is also useful for the preparation of other types of impregnated catalysts. Thus, for example, impregnated catalysts such as methanol synthesis catalysts comprising copper oxide and zinc oxide impregnated on alumina; reforming catalysts such as molybdenum oxide impregnated on alumina; etc. can be prepared in accordance with the process of our invention.

While non-aqueous impregnating solutions such as solutions in organic solvents like ethyl alcohol, acetone, isopropyl alcohol, etc., containing soluble forms of catalytic component metals can be employed, our invention is especially applicable to the preparation of catalysts from aqueous impregnating solutions. As heretofore mentioned, in such cases the wet impregnated catalyst base particles are mixed at a temperature below about 125° C., and preferably below about 100° C. Usually this preferred temperature is of the order of about 5° to 99° C. and most preferably about 25° to 95° C. When the mixing temperature is raised to a temperature in excess of 25° C. above the boiling point of the impregnating solution, e. g. in the case of aqueous impregnating solutions, above about 125° C., flashing of the impregnating solution occurs. Such flashing during mixing causes clumping of the catalyst.

As heretofore mentioned, the present process is especially useful for preparing hydrogenation catalysts, and in particular, catalysts employed in the hydro-cracking of petroleum hydrocarbons. In this type of hydrogenation, petroleum hydrocarbon feeds such as a high-boiling petroleum hydrocarbon stock like a total crude such as a West Texas, Kuwait, or Baxterville, Mississippi, crude, a topped or reduced crude, or a high-boiling petroleum distillate fraction is contacted in the presence of a hydrogenation catalyst with a hydrogen-containing gas at relatively high temperatures such as about 750° to 950° F. under high pressures such as about 250 to 2,000 pounds per square inch or more. Superior hydrogenation catalysts include the group VIa and/or group VIII metals and compounds, either singly or in combination, supported upon a base. Examples of these catalysts include molybdenum oxide, tungsten oxide, nickel, nickel oxide, tungsten sulfide, cobalt molybdate, etc., supported upon bases such as porous bases like alumina, silica-alumina, silica gel, pumice, clays such as acid-activated montmorillonite clays, aluminum silicates, etc. These bases may have little or no catalytic activity in and of themselves or in some cases may contribute to the activity of the final catalyst such as in the case of a silica-alumina base. With bases derived from natural sources, it is often desirable to treat them in some manner, as for example, acid leaching, to increase their surface area.

When the hydrocarbon feed contains sulfur, the feed is both hydrocracked and desulfurized upon contact with the catalyst under the hydrogenation conditions given above and the process is therefore referred to as a hydrodesulfurization process. The diminishment of the feed's sulfur content may be effected either by adsorption of the sulfur in the form of metallic sulfide upon the catalyst or by conversion of the sulfur into hydrogen sulfide, which is subsequently removed from the product by conventional means.

Reference should be had to the accompanying drawings which are hereby incorporated into our application and made a part thereof. These drawings are as follows:

Figure 1 is a diagrammatic view of a form of apparatus suitable for the process of our invention.

Figure 2 is a diagrammatic view of another form of apparatus suitable for the process of our invention.

Figure 3 is a diagrammatic view of another form of apparatus suitable for the process of our invention.

Referring to Figure 1, there is shown relatively simple equipment suitable for drying particles of a support such as activated alumina or a silica-alumina base impregnated with an aqueous solution of a compound of a metal such as cobalt nitrate or ammonium paramolybdate previously mixed with dry catalyst particles at a temperature below about 100° C., such as about 25° to 95° C. The mixture is introduced into fluid drier 10 through removable top head 11, which is then inserted in place on fluid drier 10. Fluidizing gas, such as warmed air, is then introduced through pipe 14 and valve 16 to the base of fluid drier 10. The particles within fluid drier 10 are maintained at a dense phase fluidized bed, preferably at temperatures somewhat below 100° C. until the main part of the water is evolved as water vapor. The water vapor passes upwardly with the fluidizing gas from fluid drier 10 through porous filter 17, pipe 18, and out of the system. When the wet impregnated catalyst base particles are partially dried, the temperature of the warmed fluidizing gas entering through pipe 14 is preferably raised and the fluid bed temperature elevated to about 125° C. and maintained there until the catalyst is dried.

Apparatus of the type described in Figure 1 was employed for the preparation of a cobalt oxide on silica-alumina hydrogenation catalyst. This catalyst was prepared by mixing microspheres comprising a silica-alumina base containing about 88 per cent by weight of silica and about 12 per cent by weight of alumina with a solution containing 2.26 weight per cent of cobalt oxide (CoO) in the form of cobalt nitrate. A particle size analysis of the base gave the following results:

| Mesh size: | Fraction, percent by weight |
|---|---|
| >50 | trace |
| 50–70 | trace |
| 70–100 | 2 |
| 100–200 | 14 |
| 200–325 | 32 |
| <325 | 52 |

The base was evacuated prior to being mixed with the cobalt nitrate solution so that the solution would be readily absorbed. The excess solution was then filtered from the mass of wet impregnated base and 83 parts by volume of the wet impregnated base were intermixed with about 164 parts by volume of dried catalyst at a temperature of about 25° C. The dried catalyst was composed of about two-thirds catalyst that had been dried previously in accordance with the process of our invention, and one-third catalyst that had been tray dried. All the previously prepared catalyst contained the same amount of impregnant as did the wet catalyst with which it was mixed. While optimum results are secured when all of the dried catalyst has been dried in accordance with the process of our invention, improved results can be obtained, as will be shown here, when a significant amount of the dried catalyst with which the wet catalyst is mixed is tray-dried catalyst. The mixture was then introduced into a fluid drying chamber such as drier 10 of Figure 1 of the drawings and fluidized and dried as described above, using heated air as the fluidizing gas and medium for supplying heat. The dried catalyst was stored at 115° C. for several hours and finally calcined at 900° F. overnight in air, after which it contained about 2.3 per cent by weight of cobalt. These final operations were performed on static catalyst as the catalyst need not necessarily be fluidized after substantially all its moisture has been removed.

The efficacy of the catalyst prepared as described was tested by charging 14.1 parts by weight of catalyst to a bomb. About 175 parts by weight of a Thermofor catalytic cracking (TCC) light cycle stock having the following inspection were also charged to this bomb:

TABLE I

*Inspection of TCC light cycle stock*

| | |
|---|---|
| Sp. gr., 60°/60° F. | 0.8713 |
| Molecular weight | 211 |
| Viscosity, SUS, Sec.: | |
| At 100° F. | 36.2 |
| At 212° F. | 5.5 |
| Refractive index, $n_D^{20}$ | 1.4929 |
| Sulfur, percent | 0.22 |
| Bromine No. | 7.2 |
| Aniline point, °F. | 130.5 |
| Vacuum distillation (temperatures corrected to 760 mm.): | |
| Over point, °F. | 314 |
| 2% at, °F. | 369 |
| 5% at, °F. | 410 |
| 10% at, °F. | 442 |
| 20% at, °F. | 464 |
| 30% at, °F. | 487 |
| 40% at, °F. | 505 |
| 50% at, °F. | 525 |
| 60% at, °F. | 540 |
| 70% at, °F. | 559 |
| 80% at, °F. | 579 |
| 90% at, °F. | 601 |
| 95% at, °F. | 617 |

About 8.5 parts by weight of hydrogen were added to the bomb after which the bomb was heated to 750° F., held at this temperature for 62 minutes and then cooled rapidly. The pressure at 750° F. was approximately 1800 pounds per square inch. An examination of the products revealed that about 30.4 weight per cent of the cycle stock had been converted to gasoline boiling below 392° F.

Another batch of silica-alumina base was impregnated in an identical solution of cobalt nitrate. The cobalt nitrate was then drained, and the wet impregnated catalyst base dried by tray drying at 125° C. The tray-dried catalyst was calcined overnight at 900° F. in air and was utilized as a hydrogenation catalyst for the conversion of Thermofor catalytic cracking light cycle stock under identical conditions to those heretofore mentioned. The product obtained from this conversion contained but 24.6 weight per cent of gasoline boiling up to 392° F.

It is to be noted that the tray-dried catalyst represents a catalyst prepared by one of the best prior art procedures. Moreover, it is to be emphasized that even in the absence of a hydrogenation catalyst 3 to 4 weight per cent of the product comprises gasoline under the conversion conditions of high temperature and pressure employed for the hydrogenation.

The procedure set forth above is especially applicable for the batch preparation of relatively small batches of catalyst although, of course, it can be successfully employed for large scale catalyst production. However, when large scale catalyst production is desired, it is preferable to utilize a continuous procedure. One such procedure which can advantageously be employed is that set forth in Figure 2.

Referring to Figure 2, fluidizing gas, such as warmed air, is introduced into fluid drier 20 through line 22 and valve 24 and maintains a dense phase fluid bed comprising dried catalyst and wet impregnated catalyst base particles in fluid drier 20. The fluid bed is maintained at a temperature somewhat below 100° C., such as about 25° to 95° C. Wet impregnated catalyst is continuously added to fluid drier 20 as small clumps from line 26, valve 28 and line 30. These clumps of wet impregnated catalyst base fall through the dilute or dispersed phase above the dense phase fluid catalyst bed and then into the dense phase fluid catalyst bed. Impingement by the dried fluidized catalyst particles in the dense phase fluid bed breaks up the clumps and scatters them throughout the dense phase fluid bed. Within the dense phase fluid bed the scattered wet impregnated catalyst base particles undergo drying and release water vapors. The water vapors are carried upwardly with the fluidizing gas out of fluid drier 20 through cyclone separator 32 and line 34. Cyclone separator 32 returns entrained catalyst particles to the dense phase fluid bed in fluid drier 20.

The catalyst particles may be partially dried in fluid drier 20 and then withdrawn through standpipe 36 for further drying in external equipment (not shown). Alternatively, they may be substantially dried in fluid drier 20 before withdrawal from standpipe 36. The degree of drying can be regulated by adjusting the rate of influx of wet impregnated catalyst base particles, the influx of the fluidizing gas, and the drying conditions within the fluid drier. When only a partial drying of the wet catalyst base is effected in fluid drier 20, it is advisable to complete the drying in another fluid drier in accordance with the process of our invention. However, sometimes when a substantial degree of partial drying has been effected, improved catalyst can be obtained even though the residual drying is accomplished in a tray drier or other form of non-fluid drying equipment.

Figure 3:
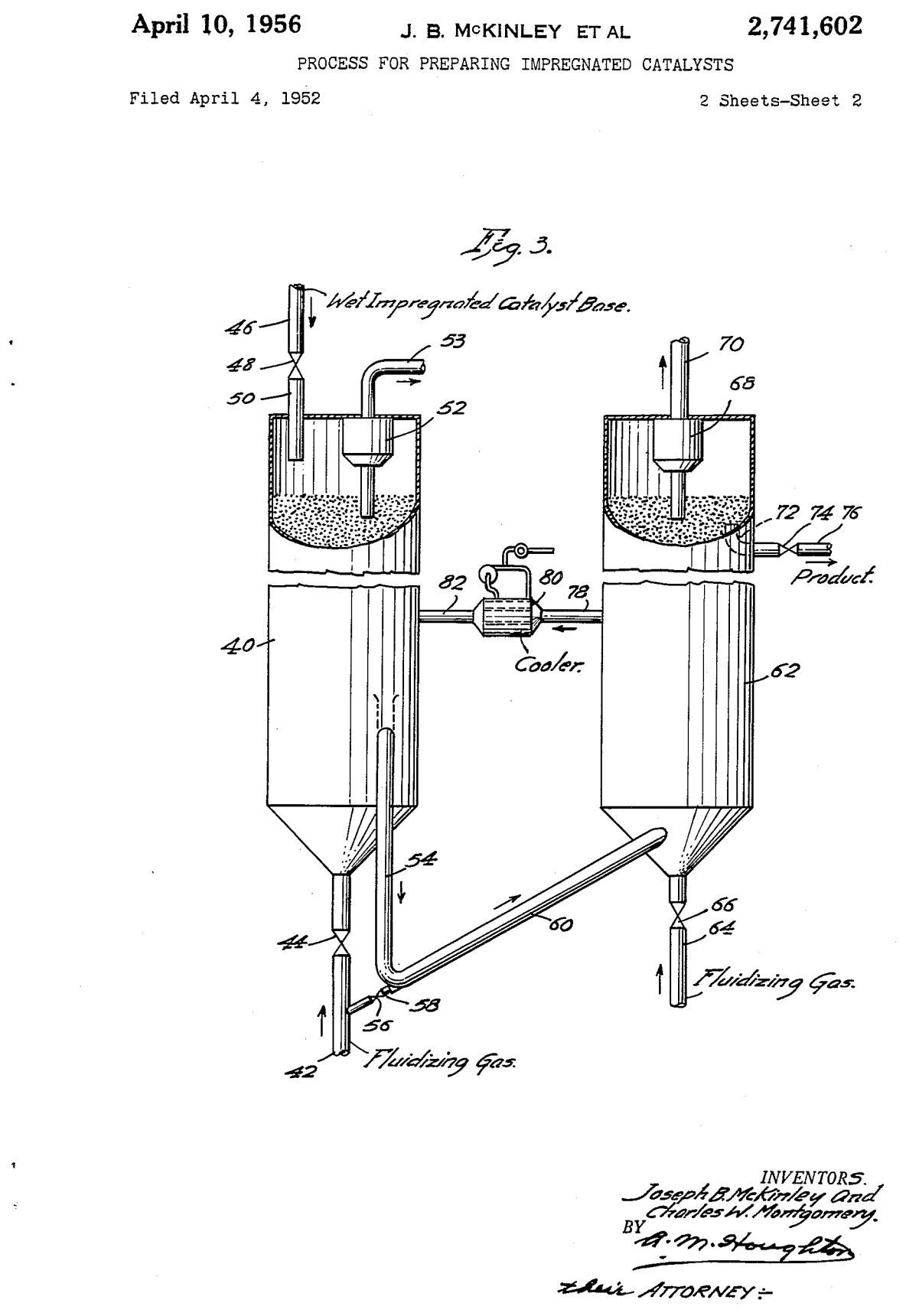

An alternative continuous procedure which is to be preferred in many cases where substantially complete drying of the catalyst is desired is that disclosed in the embodiment shown in Figure 3. Referring to Figure 3, a dense phase fluid bed containing a mixture of wet impregnated catalyst base particles and dried catalyst is maintained in fluid drier 40. Fluidizing gas, such as warmed air, is introduced from line 42 and valve 44 to the bottom of fluid drier 40 and maintains the dense phase fluid bed at a temperature below about 100° C. such as about 25° to 95° C. The wet impregnated catalyst base in the form of small clumps is added to the dilute phase above the dense phase fluid bed in fluid drier 40 through line 46, valve 48 and line 50. The wet impregnated catalyst clumps fall into the dense phase fluid bed and are disintegrated and at least partially dried therein. The water vapors from the wet impregnated catalyst base are removed with the fluidizing gas through cyclone separator 52 and pipe 53. The cyclone separator serves to return entrained catalyst to fluid drier 40.

Partially dried catalyst base particles are removed from fluid drier 40 through standpipe 54 and are conveyed by means of fluidizing gas introduced through valve 56 and line 58 through pipe 60 to second fluid drier 62. Hot fluidizing gas such as air from line 64 and valve 66 serves to maintain a dense phase bed of dried catalyst particles in fluid drier 62. This hot fluidizing gas from line 64 is heated well above 100° C. and maintains the bed within fluid drier 62 at a temperature of the order of 125° C. Residual moisture removed from the catalyst base particles in fluid drier 62 is withdrawn with the fluidizing gas through cyclone separator 68 and pipe 70. Cyclone separator 68 returns entrained catalyst to the dense phase catalyst bed in fluid drier 62. Dried catalyst particles are removed from fluid drier 62 through pipe 72, valve 74, and pipe 76 and are then passed to a product accumulator (not shown).

A portion of the dried catalyst from fluid drier 62 is removed through line 78 and passed to cooler 80 wherein it is cooled to substantially the same temperature as that found within fluid drier 40. The cooled catalyst from cooler 80 is then passed through line 82 to fluid drier 40. The rate of addition of particles to fluid drier 40 from lines 50 and 82 is regulated to conform with the removal rate through standpipe 54 so that a constant inventory is maintained within fluid drier 40.

While the foregoing embodiments of our process constitute preferred operating procedures, it is obvious that our process may be modified by one skilled in the art. It is understood that these modifications constitute a part of our invention and are to be considered as included within the appended claims. By way of example, in place of dropping wet catalyst into a fluid drier from a pipe such as shown in Figures 2 and 3, a mechanical dispersing device for adding the wet catalyst into the fluid bed can be used.

The utilization of our invention permits the manufacture of uniformly impregnated catalyst. Moreover, the process of our invention permits accelerated drying of impregnated catalyst. Thus, unlike tray-dried catalysts in which the heated gases pass over the drying particles, in the process of our invention drying is attained by the passage of heated gases through the bed of catalyst particles. Inasmuch as smaller volumes of heated drying gases are required in the practice of our invention, the investment cost of heaters and other drying equipment is materially reduced.

Obviously many modifications and variations of the invention as hereinbefore set forth may be made without departing from the spirit and scope thereof; therefore only such limitations should be imposed as are indicated in the appended claims.

We claim:

1. A process for preparing an impregnated catalyst which comprises impregnating finely divided catalyst base particles with an impregnating solution containing a component of the catalyst, removing excess impregnating solution from the wet impregnated catalyst base particles, mixing said wet impregnated catalyst base particles with previously dried impregnated catalyst particles at a temperature of not more than about 25° C. above the boiling point of the impregnating solution, and at least partially drying the mixture by maintaining it fluidized.

2. A process for preparing an impregnated catalyst which comprises impregnating finely divided catalyst base particles with an aqueous impregnating solution, removing excess impregnating solution from the wet impregnated catalyst base particles, mixing said wet impregnated catalyst base particles at a temperature below about 125° C. with previously dried impregnated catalyst particles, and at least partially drying the mixture by maintaining it fluidized.

3. A process for preparing an impregnated catalyst which comprises impregnating finely divided catalyst base particles with an aqueous impregnating solution, removing excess impregnating solution from the wet impregnated catalyst base particles, mixing said wet impregnated catalyst base particles at a temperature below about 100° C. with previously dried impregnated catalyst particles, and at least partially drying the mixture by maintaining it fluidized.

4. A process for preparing an impregnated catalyst which comprises impregnating finely divided catalyst base particles with an aqueous impregnating solution, removing excess impregnating solution from the wet impregnated catalyst base particles, mixing said wet impregnated catalyst base particles at a temperature of about 25° to 95° C. with previously dried impregnated catalyst particles, and at least partially drying the mixture by maintaining it fluidized.

5. A process for preparing an impregnated catalyst which comprises impregnating finely divided catalyst base particles with an aqueous impregnating solution, removing excess impregnating solution from the wet impregnated catalyst base particles, mixing said wet impregnated catalyst base particles at a temperature of about 25° to 95° C. with previously dried impregnated catalyst particles, and at least partially drying the mixture by maintaining it fluidized at a temperature below about 100° C.

6. A process for preparing an impregnated catalyst which comprises impregnating finely divided catalyst base particles with an aqueous impregnating solution containing a component of the catalyst, removing excess impregnating solution from the wet impregnated catalyst base particles, mixing said wet impregnated catalyst base particles with previously dried impregnated catalyst particles at a temperature below about 100° C., fluidizing the mixture, and at least partially drying the wet impregnated catalyst base particles by maintaining the mixture fluidized at a temperature below about 150° C.

7. A process for preparing an impregnated catalyst which comprises impregnating finely divided catalyst base particles with an aqueous impregnating solution containing a component of the catalyst, removing excess impregnating solution from the wet impregnated catalyst base particles, adding said wet empregnated catalyst base particles to a fluid bed containing dried impregnated catalyst particles, said fluid bed being maintained at a temperature below about 100° C. during the addition, and at least partially drying the added wet impregnated catalyst base particles by maintaining the fluid bed at a temperature below about 150° C.

8. A process for preparing an impregnated catalyst which comprises impregnating finely divided catalyst base particles with an aqueous impregnating solution containing a component of the catalyst, removing excess impregnating solution from the wet impregnated catalyst base particles, adding said wet impregnated catalyst base particles to a fluid bed containing dried catalyst particles, said fluid bed being maintained at a temperature below about 100° C., partially drying the wet impregnated catalyst base particles in said fluid bed, transferring the partially dried impregnated catalyst base particles to a second fluid bed containing dried catalyst particles, and drying the transferred catalyst base particles by maintaining the second fluid bed at a temperature in excess of 100° C.

9. A process for preparing an impregnated catalyst which comprises impregnating finely divided catalyst base particles with an aqueous impregnating solution containing a component of the catalyst, removing excess impregnating solution from the wet impregnated catalyst base particles, adding said wet impregnated catalyst base particles to a first fluid bed containing dried catalyst particles, said first fluid bed being maintained at a temperature below about 100° C., partially drying the wet impregnated catalyst base particles in said first fluid bed, transferring the partially dried impregnated catalyst base particles to a second fluid bed containing dried catalyst particles, drying the transferred catalyst base particles by maintaining the second fluid bed at a temperature in excess of 100° C., removing a portion of the dried fluidized catalyst particles from the second fluid bed, cooling said removed portion to substantially the same temperature as said first fluid bed and recycling it to the first fluid bed.

References Cited in the file of this patent

UNITED STATES PATENTS 2,592,016   Engel ------------------ Apr. 8, 1952